United States Patent
Saeidi (10) Patent No.: US 10,839,810 B2
(45) Date of Patent: Nov. 17, 2020

(54) SPEAKER ENROLLMENT

(71) Applicant: Cirrus Logic International Semiconductor Ltd., Edinburgh (GB)

(72) Inventor: Rahim Saeidi, Surrey (GB)

(73) Assignee: Cirrus Logic, Inc., Austin, TX (US)

( * ) Notice: Subject to any disclaimer, the term of this patent is extended or adjusted under 35 U.S.C. 154(b) by 104 days.

(21) Appl. No.: 16/192,914

(22) Filed: Nov. 16, 2018

(65) Prior Publication Data

US 2019/0156836 A1    May 23, 2019

Related U.S. Application Data

(60) Provisional application No. 62/589,033, filed on Nov. 21, 2017.

(30) Foreign Application Priority Data

Feb. 1, 2018    (GB) .................................. 1801657.6

(51) Int. Cl.

| | | |
|---|---|---|
| *G10L 17/04* | (2013.01) | |
| *G10L 17/02* | (2013.01) | |
| *G10L 17/00* | (2013.01) | |
| G10L 21/0364 | (2013.01) | |
| G10L 17/20 | (2013.01) | |

(52) U.S. Cl.
CPC .............. *G10L 17/04* (2013.01); *G10L 17/00* (2013.01); *G10L 17/02* (2013.01); *G10L 17/20* (2013.01); *G10L 2021/03646* (2013.01)

(58) Field of Classification Search
CPC .......... G10L 17/04; G10L 17/00; G10L 17/02
USPC ........................................................ 704/246
See application file for complete search history.

(56) References Cited

U.S. PATENT DOCUMENTS

| | | | |
|---|---|---|---|
| 5,313,555 A | 5/1994 | Kamiya | |
| 5,361,324 A | 11/1994 | Takizawa et al. | |
| 5,742,978 A * | 4/1998 | Vetter | E05F 7/005 |
| | | | 16/220 |
| 5,864,809 A | 1/1999 | Suzuki | |
| 9,293,130 B2 * | 3/2016 | Amini | G10L 15/22 |
| 2017/0169828 A1 | 6/2017 | Sachdev | |

OTHER PUBLICATIONS

Combined Search and Examination Report under Sections 17 and 18(3), UKIPO, Application No. GB1801657.6, dated Jul. 13, 2018.
Kwak & Kang, "Robust formant features for speaker verification in the Lombard effect", p. 114-118, Asia-Pacific Signal and Information Processing Association Annual Summit and Conference (APSIPA), Issue Date: Dec. 16-19, 2015.

(Continued)

*Primary Examiner* — Susan I McFadden
(74) *Attorney, Agent, or Firm* — Jackson Walker L.L.P.

(57) ABSTRACT

A method of speaker modelling for a speaker recognition system, comprises: receiving a signal comprising a speaker's speech; and, for a plurality of frames of the signal: obtaining a spectrum of the speaker's speech; generating at least one modified spectrum, by applying effects related to a respective vocal effort; and extracting features from the spectrum of the speaker's speech and the at least one modified spectrum. The method further comprises forming at least one speech model based on the extracted features.

13 Claims, 4 Drawing Sheets

(56) References Cited

OTHER PUBLICATIONS

International Search Report and Written Opinion of the International Searching Authority, International Application No. PCT/GB2018/053353, dated Feb. 12, 2019.
Yang, Yingchun et al.: "Frequency Shifting for Emotional Speaker Recognition", Sep. 1, 2009, pp. 305-318, XP055548587, retrieved from the Internet Jan. 29, 2019.
Saeidi, Rahim et al.: "Feature Extraction Using Power-Law Adjusted Linear Prediction with Application to Speaker Recognition under Severe Vocal Effort Mismatch", IEEE/ACM Transactions on Audio, Speech, and Language Processing, USA, vol. 24, No. 1, Jan. 1, 2016, pp. 42-53.
Traunmuller, Hartmut et al: "Acoustic Effects of Variation in Vocal Effort by Men, Women, and Children", The Journal of the Acoustical Society of America, American Institute of Physics for the Acoustical Society of America, New York, NY, US, vol. 107, No. 6, Jun. 1, 2000, pp. 3438-3451.

\* cited by examiner

SPEAKER ENROLLMENT

TECHNICAL FIELD

Embodiments described herein relate to methods and devices for speaker enrollment, for example in a speaker recognition system.

BACKGROUND

Speaker recognition systems are known, in which a user is able to provide spoken inputs to a system, for example to control the operation of some aspect of the system. To provide a degree of security, the system attempts to verify that the speaker is a person who is authorised to provide that input to the system. This is referred to herein as speaker recognition, which can include speaker identification, where the system attempts to determine which of several enrolled users is speaking, and speaker verification, where the system attempts to determine whether the speaker is who they claim to be. The process of speaker recognition typically requires that the user should enroll with the system before first using it. Enrollment requires that the user speak some words or phrases, and the system then obtains a model of the user's speech. In subsequent use of the system, any spoken input is compared with the model of the enrolled user's speech, to verify whether the speaker is the enrolled user.

One issue with this process is that properties of a speaker's voice may vary. For example, a user will typically enroll with the system by choosing to speak when conditions seem good, for example when there is a relatively low level of background noise. However, in use, conditions may be less good. For example, there may be a high level of background noise, or the user may be located some distance away from the device that includes the speaker recognition system. These factors will typically mean that the user will use a higher level of vocal effort in their voice production, and this higher level of vocal effort will often change some characteristics of the user's speech. The change in vocal effort is in addition to any adverse effects of additive noise or reverberation as a result of far-field speech.

SUMMARY

According to an aspect of the present invention, there is provided a method of speaker modelling for a speaker recognition system. The method comprises receiving a signal comprising a speaker's speech. For a plurality of frames of the signal, a spectrum of the speaker's speech is obtained, at least one modified spectrum is generated, by applying effects related to a respective vocal effort, and features are extracted from the spectrum of the speaker's speech and the at least one modified spectrum. At least one speech model is formed based on the extracted features.

The spectrum of the speaker's speech may be obtained for a plurality of frames of the signal containing voiced speech. The frames may be overlapping. Each frame may have a duration between 10 ms and 50 ms.

The method may comprise generating a plurality of modified spectra, by applying effects related to respective vocal efforts.

The step of generating at least one modified spectrum may comprise: determining a frequency and a bandwidth of at least one formant component of the speaker's speech; generating at least one modified formant component by modifying at least one of the frequency and the bandwidth of the or each formant component; and generating the modified spectrum from the or each modified formant component.

The method may comprise determining a frequency and a bandwidth of a number of formant components of the speaker's speech in the range from 3-5.

Generating modified formant components may comprise modifying the frequency and the bandwidth of the or each formant component.

The features extracted from the spectrum of the user's speech may comprise Mel Frequency Cepstral Coefficients.

The step of forming at least one speech model may comprise forming a model of the speaker's speech, and the method may then be performed on enrolling the speaker in the speaker recognition system.

The step of forming at least one speech model may comprise forming a background model for the speaker recognition system, based in part on said speaker's speech.

According to another aspect of the present invention, there is provided a system for speaker modelling for a speaker recognition system, the system being configured for performing a method in accordance with the first aspect. In that case, the system may comprise: an input, for receiving a signal comprising a speaker's speech; and a processor, configured for, for a plurality of frames of the signal: obtaining a spectrum of the speaker's speech; generating at least one modified spectrum, by applying effects related to a respective vocal effort; extracting features from the spectrum of the speaker's speech and the at least one modified spectrum; and forming at least one speech model based on the extracted features.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
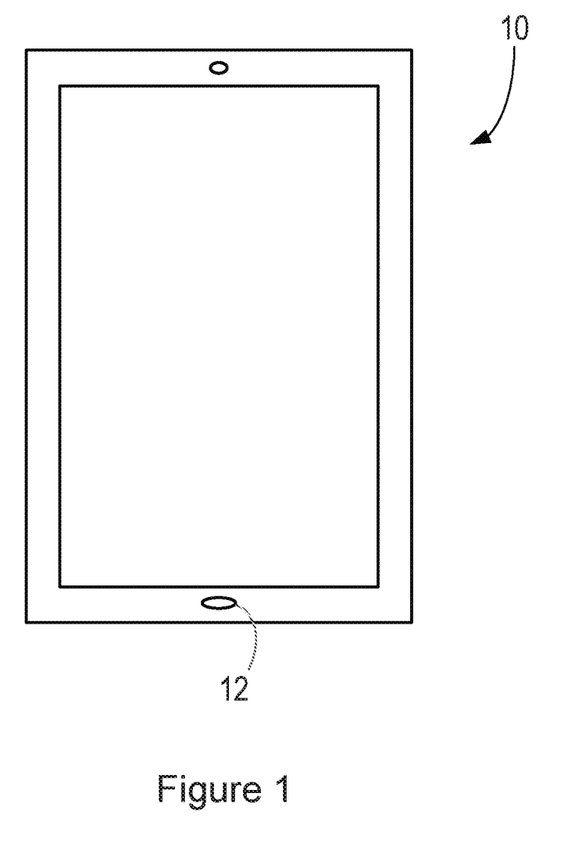
FIG. 1 illustrates a smartphone.

FIG. 1 illustrates a smartphone 10, having one or more microphone 12 for detecting ambient sounds. In normal use, the microphone is of course used for detecting the speech of a user who is holding the smartphone 10.

Although an illustrative example of the method described herein is implemented in a smartphone, the method may be implemented in any suitable device.

Figure 2:
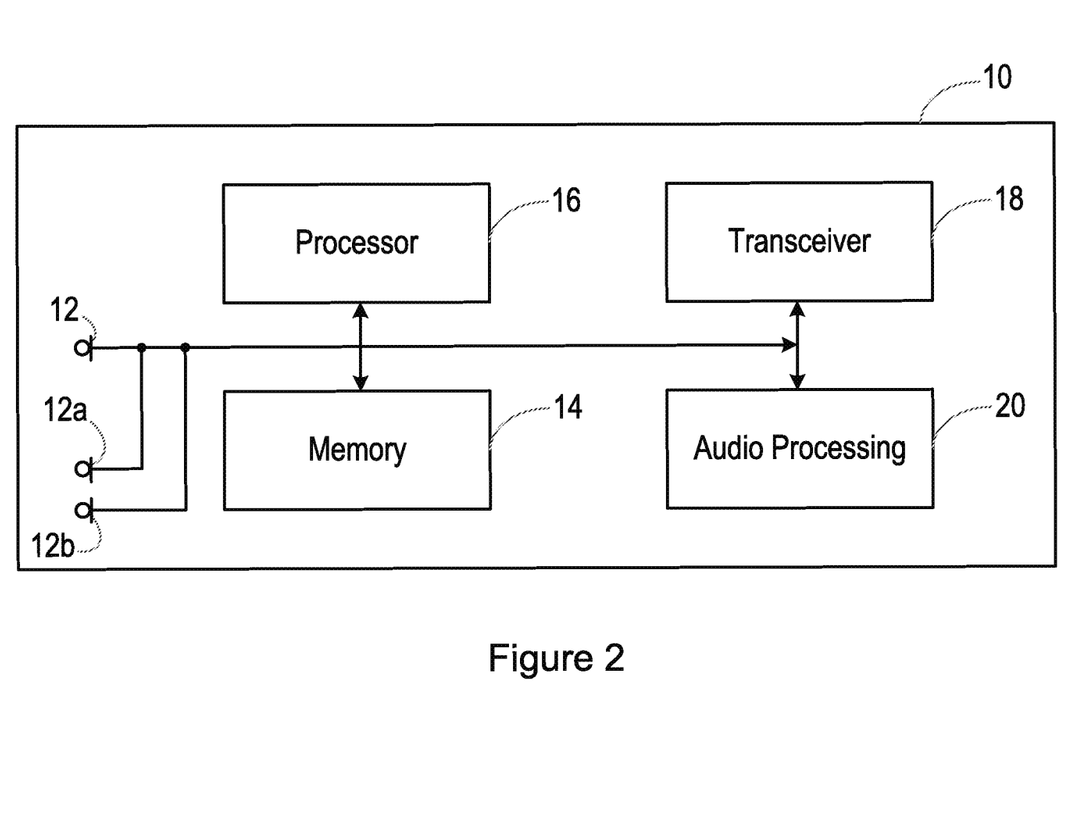
FIG. 2 is a schematic diagram, illustrating the form of the smartphone.

FIG. 2 is a schematic diagram, illustrating the form of the smartphone 10.

Specifically, FIG. 2 shows various interconnected components of the device, in this case the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc. In this case, the system may select a signal generated by just one of these microphones. Alternatively, the signals generated by the multiple microphones can be combined to form a single input signal.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device. In other examples, some or all of the speech recognition is performed in the smartphone 10.

The voice biometric functionality attempts to confirm whether the speaker was the enrolled user, by comparing the speaker's voice with a model that has been obtained during an enrollment process.

Figure 3:
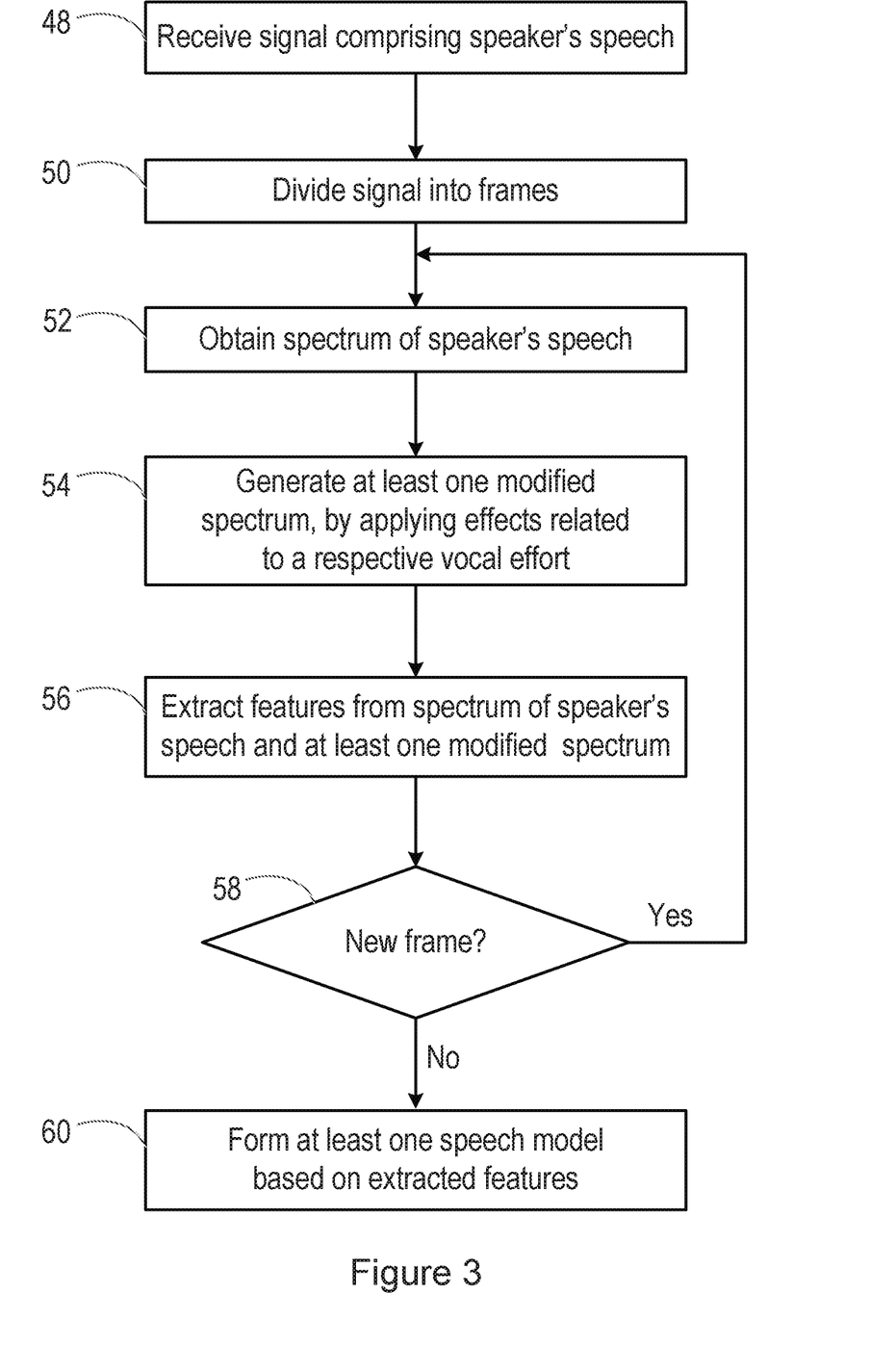
FIG. 3 is a flow chart illustrating a method of speaker enrollment.
Figure 4:
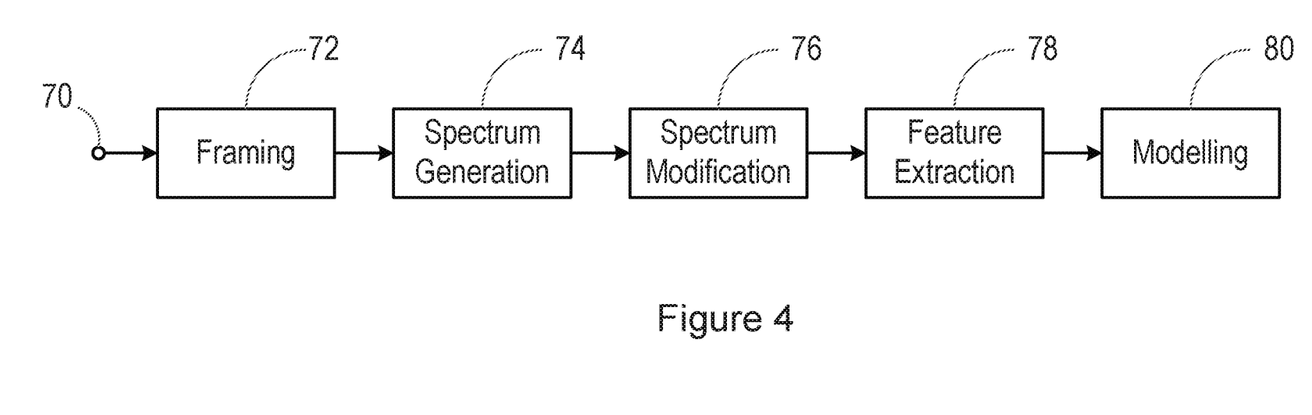
FIG. 4 illustrates a system for speaker enrollment.

FIG. 3 is a flow chart, illustrating a method of speaker enrollment in a voice biometrics system, and FIG. 4 is a block diagram illustrating functional blocks in the voice biometrics system.

Specifically, in step 48 in the method of FIG. 3, a speech signal is received on an input 70 of the system shown in FIG. 4.

For example, the speech signal may be received from the microphone 12 of the device 10, typically after the user has indicated a wish to enroll with the speaker recognition system. For example, the user may have been prompted to speak particular words or phrases. Alternatively, the speech signal may represent words or phrases chosen by the user. As a further alternative, the enrollment process may be started on the basis of random speech of the user.

The signal received on the input 70 is passed to a framing block 72, which divides the received signal into frames, as shown in step 50 of FIG. 3.

For example, the received signal may be divided into overlapping frames. As one example, the received signal may be divided into frames of length 20 ms, with each frame overlapping the preceding frame by 10 ms. As another example, the received signal may be divided into frames of length 30 ms, with each frame overlapping the preceding frame by 15 ms.

In step 52 of the method of FIG. 3, a frame is passed to the spectrum estimation block 74. The spectrum generation block 74 extracts the short term spectrum of one frame of the user's speech. For example, the spectrum generation block 74 may perform a linear prediction (LP) method. More specifically, the short term spectrum can be found using an L1-regularised LP model to perform an all-pole analysis.

Based on the short term spectrum, it is possible to determine whether the user's speech during that frame is voiced or unvoiced. There are several methods that can be used to identify voiced and unvoiced speech, for example: using a deep neural network (DNN), trained against a golden reference, for example using Praat software; performing an autocorrelation with unit delay on the speech signal (because voiced speech has a higher autocorrelation for non-zero lags); performing a linear predictive coding (LPC) analysis (because the initial reflection coefficient is a good indicator of voiced speech); looking at the zero-crossing rate of the speech signal (because unvoiced speech has a higher zero-crossing rate); looking at the short term energy of the signal (which tends to be higher for voiced speech); tracking the first formant frequency F0 (because unvoiced speech does not contain the first format frequency); examining the error in a linear predictive coding (LPC) analysis (because the LPC prediction error is lower for voiced speech); using automatic speech recognition to identify the words being spoken and hence the division of the speech into voiced and unvoiced speech; or fusing any or all of the above.

Voiced speech is more characteristic of a particular speaker, and so, in some embodiments, frames that contain little or no voiced speech are discarded, and only frames that contain significant amounts of voiced speech are considered further.

In step 54 of the method of FIG. 3, the extracted short term spectrum for a frame is passed to the spectrum modification block 76, which generates at least one modified spectrum, by applying effects related to a respective vocal effort.

That is, it is recognised that the vocal effort used by a speaker will distort spectral features of the speaker's voice. This is referred to as the Lombard effect.

In one embodiment, it is assumed here that the user will perform the enrollment process under relatively favourable conditions, for example in the presence of low ambient noise, and with the device positioned relatively close to the user's mouth. The instructions provided to the user at the start of the enrollment process may suggest that the process be carried out under such conditions. Moreover, measurement of metrics such as the signal-to-noise ratio may be used to test that the enrollment was performed under suitable conditions. In such conditions, the vocal effort required will be relatively low.

However, it is recognised that, in use after enrollment, when it is desired to verify that a speaker is indeed the enrolled user, the level of vocal effort employed by the user may vary. For example, the user may be in the presence of higher ambient noise, or may be speaking into a device that is located at some distance from their mouth, for example.

Thus, one or more modified spectrum is generated by the spectrum modification block 76. The or each modified spectrum corresponds to a particular level of vocal effort, and the modifications correspond to the distortions that are produced by the Lombard effect.

For example, in one embodiment, the spectrum obtained in step 52 is characterised by a frequency and a bandwidth of one or more formant components of the user's speech. For example, the first four formants may be considered. In another embodiment, only the first formant is considered. Where the spectrum generation block 74 performs an all-pole analysis, as mentioned above, the conjugate poles contributing to those formants may be considered.

Then, one or more respective modified formant components is generated. For example, the modified formant component or components may be generated by modifying at least one of the frequency and the bandwidth of the formant component or components. Where the spectrum generation block 74 performs an all-pole analysis, and the conjugate poles contributing to those formants are considered, as mentioned above, the modification may comprise modifying the pole amplitude and/or angle in order to achieve the intended frequency and/or bandwidth modification.

For example, with increasing vocal effort, the frequency of the first formant, F1, may increase, while the frequency of the second formant, F2, may slightly decrease. Similarly, with increasing vocal effort, the bandwidth of each formant may decrease. One attempt to quantify the changes in the frequency and the bandwidth of the first four formant components, for different levels of ambient noise, is provided in I. Kwak and H. G. Kang, "Robust formant features for speaker verification in the Lombard effect", 2015 Asia-Pacific Signal and Information Processing Association Annual Summit and Conference (APSIPA), Hong Kong, 2015, pp. 114-118. The ambient noise causes the speaker to use a higher vocal effort, and this change in vocal effort produces effects on the spectrum of the speaker's speech.

A modified spectrum can then be obtained from each set of modified formant components.

Thus, as examples, one, two, three, four, five, up to ten, or more than ten modified spectra may be generated, each having modifications that correspond to the distortions that are produced by a particular level of vocal effort.

By way of example, in which only the first formant is considered, FIG. 3 of the document "Robust formant features for speaker verification in the Lombard effect", mentioned above, indicates that the frequency of the first formant, F1, will on average increase by about 10% in the presence of babble noise at 65 dB SPL, by about 14% in the presence of babble noise at 70 dB SPL, by about 17% in the presence of babble noise at 75 dB SPL, by about 8% in the presence of pink noise at 65 dB SPL, by about 11% in the presence of pink noise at 70 dB SPL, and by about 15% in the presence of pink noise at 75 dB SPL. Meanwhile, FIG. 4 indicates that the bandwidth of the first formant, F1, will on average decrease by about 9% in the presence of babble noise at 65 dB SPL, by about 9% in the presence of babble noise at 70 dB SPL, by about 11% in the presence of babble noise at 75 dB SPL, by about 8% in the presence of pink noise at 65 dB SPL, by about 9% in the presence of pink noise at 70 dB SPL, and by about 10% in the presence of pink noise at 75 dB SPL.

Therefore, these variations can be used to form modified spectra from the spectrum obtained in step 52. For example, if it is desired to form two modified spectra, then the effects of babble noise and pink noise, both at 70 dB SPL, can be used to form the modified spectra.

Thus, a modified spectrum representing the effects of babble noise at 70 dB SPL can be formed by taking the spectrum obtained in step 52, and by then increasing the frequency of the first formant, F1, by 14%, and decreasing the bandwidth of F1 by 9%. A modified spectrum representing the effects of pink noise at 70 dB SPL can be formed by taking the spectrum obtained in step 52, and by then increasing the frequency of the first formant, F1, by 11%, and decreasing the bandwidth of F1 by 9%.

FIGS. 3 and 4 of the document mentioned above also indicate the changes that occur in the frequency and bandwidth of other formants, and so these effects can also be taken into consideration when forming the modified spectra, in other examples. In step 56 of the method of FIG. 3, the extracted short term spectrum for the frame, and the or each modified spectrum, are passed to a feature extraction block 78, which extracts features of the spectra.

For example, the features that are extracted may be Mel Frequency Cepstral Coefficients (MFCCs), although any suitable features may be extracted, for example Perceptual Linear Prediction (PLP) features, Linear Predictive Coding (LPC) features, Linear Frequency Cepstral coefficients (LFCC), features extracted from Wavelets or Gammatone filterbanks, or Deep Neural Network (DNN)-based features may be extracted.

In step 58 of the method of FIG. 3, it is determined whether there are any further frames to be analysed. If there are, the process returns to step 52, and the subsequent steps are repeated. If there are no further frames to be analysed, for example because the user has stopped speaking or because an upper time limit has been reached, the process passes to step 60, in which a modelling block 80 forms at least one model of the user's speech based on the features extracted in step 56.

One possibility is that the modelling block 80 could form a single model, based on the extracted features of the short term spectra for the multiple frames of the enrolling speaker's speech, and on the or each modified spectrum obtained for each of the multiple frames. In subsequent use, the user's speech is then compared against that model.

Another possibility is that the modelling block 80 could form one model, based on the extracted features of the spectra for the multiple frames of the enrolling speaker's speech. The modelling block 80 could then also form another model, based on the modified spectra obtained from the multiple frames, for each of the effort levels used to generate the modified spectra. Thus, in this case, if in step 54 two modified spectra are generated for each frame, based on first and second levels of additional vocal effort, then the modelling block 80 could form one model, based on the extracted features of the unmodified spectra for the multiple frames of the enrolling speaker's speech, and two additional models, with one additional model being based on the spectra for the multiple frames of the enrolling speaker's speech modified according to the first level of additional vocal effort, and the second additional model being based on the spectra for the multiple frames of the enrolling speaker's speech modified according to the second level of additional vocal effort.

In subsequent use, the user's speech is then compared separately against each of those models.

Thus, in either case, the user's speech can be compared against a model that takes account of possible distortions caused by additional vocal effort.

In the examples given above, a user's speech is modelled for the purposes of enrollment in a speaker recognition system.

In other examples, the same method can be used for the purposes of modelling the speech of one or more person for use in forming a background model to be used in a speaker recognition system.

Thus, in many speaker recognition systems, development speech, from a number of different speakers, is used to form a background model, for example a universal background model (UBM). The speech received at the test stage is compared with the model obtained from the speech of the user at enrollment and with the background model, in order to determine whether the speech received at the test stage has come from the enrolled speaker.

The method described herein can be used when forming the background model. Specifically, as mentioned above, the background model is based on the speech of multiple speakers. For one or more of those multiple speakers, a signal may be received comprising a speaker's speech. Then, for a plurality of frames of the signal, a spectrum of the or each speaker's speech is obtained, and at least one modified spectrum is generated, by applying effects related to a respective vocal effort.

Features from the spectrum of the or each speaker's speech and the at least one modified spectrum are then used in forming the background model, which contains the model of the or each speaker's speech. Features from the spectrum of other speakers' speech can also be used in forming the background model.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker modelling for a speaker recognition system, comprising:
  receiving a signal comprising a speaker's speech; and,
  for a plurality of frames of the signal:
    obtaining a spectrum of the speaker's speech;
    generating at least one modified spectrum, by applying effects related to a respective vocal effort, wherein the step of generating at least one modified spectrum comprises:
      determining a frequency and a bandwidth of at least one formant component of the speaker's speech;
      generating at least one modified formant component by modifying at least one of the frequency and the bandwidth of the or each formant component; and
      generating the modified spectrum from the or each modified formant component; and
  extracting features from the spectrum of the speaker's speech and the at least one modified spectrum; and
  forming at least one speech model based on the extracted features.

2. A method according to claim 1, comprising:
  obtaining the spectrum of the speaker's speech for a plurality of frames of the signal containing voiced speech.

3. A method according to claim 1, comprising:
obtaining the spectrum of the speaker's speech for a plurality of overlapping frames of the signal.

4. A method according to claim 1, wherein each frame has a duration between 10 ms and 50 ms.

5. A method according to claim 1, comprising:
generating a plurality of modified spectra, by applying effects related to respective vocal efforts.

6. A method according to claim 1, wherein the step of forming at least one speech model comprises forming a background model for the speaker recognition system, based in part on said speaker's speech.

7. A method according to claim 1, comprising determining a frequency and a bandwidth of a number of formant components of the speaker's speech in the range from 3-5.

8. A method according to claim 1, wherein generating modified formant components comprises:
modifying the frequency and the bandwidth of the or each formant component.

9. A method according to claim 1, wherein the features extracted from the spectrum of the user's speech comprise Mel Frequency Cepstral Coefficients.

10. A method according to claim 1, wherein the step of forming at least one speech model comprises forming a model of the speaker's speech.

11. A method according to claim 10, wherein the method is performed on enrolling the speaker in the speaker recognition system.

12. A non-transitory computer readable storage medium having computer-executable instructions stored thereon that, when executed by processor circuitry, cause the processor circuitry to perform a method comprising:
receiving a signal comprising a speaker's speech; and
for a plurality of frames of the signal:
obtaining a spectrum of the speaker's speech;
generating at least one modified spectrum, by applying effects related to a respective vocal effort, wherein the step of generating at least one modified spectrum comprises:
determining a frequency and a bandwidth of at least one formant component of the speaker's speech;
generating at least one modified formant component by modifying at least one of the frequency and the bandwidth of the or each formant component; and
generating the modified spectrum from the or each modified formant component;
extracting features from the spectrum of the speaker's speech and the at least one modified spectrum; and
further comprising:
forming at least one speech model based on the extracted features.

13. A system for speaker modelling, the system comprising:
an input, for receiving a signal comprising a speaker's speech; and,
a processor, configured for, for a plurality of frames of the signal:
obtaining a spectrum of the speaker's speech;
generating at least one modified spectrum, by applying effects related to a respective vocal effort, wherein the step of generating at least one modified spectrum comprises:
determining a frequency and a bandwidth of at least one formant component of the speaker's speech;
generating at least one modified formant component by modifying at least one of the frequency and the bandwidth of the or each formant component; and
generating the modified spectrum from the or each modified formant component;
extracting features from the spectrum of the speaker's speech and the at least one modified spectrum; and
forming at least one speech model based on the extracted features.

* * * * *